United States Patent [19]
Lee et al.

[11] Patent Number: 5,738,709
[45] Date of Patent: Apr. 14, 1998

[54] NITROGEN PSA WITH INTERMEDIATE PRESSURE TRANSFER

[75] Inventors: Sang Kook Lee, Allentown; Robert Paul, Nesquehonig, both of Pa.

[73] Assignee: Air Products and Chemicals, Inc., Allentown, Pa.

[21] Appl. No.: 781,951

[22] Filed: Dec. 20, 1996

[51] Int. Cl.$^6$ ................................................ B01D 53/047
[52] U.S. Cl. ..................... 95/98; 95/105; 95/138
[58] Field of Search .................. 95/96–98, 100–105, 95/138

[56] References Cited

U.S. PATENT DOCUMENTS

| | | | |
|---|---|---|---|
| 3,365,859 | 1/1968 | Sandberg | 95/105 |
| 4,015,956 | 4/1977 | Münzer et al. | 95/96 |
| 4,348,213 | 9/1982 | Armond | 95/103 |
| 4,576,614 | 3/1986 | Armond et al. | 95/96 X |
| 4,715,867 | 12/1987 | Vo | 55/26 |
| 4,925,461 | 5/1990 | Gemba et al. | 95/98 |
| 5,176,722 | 1/1993 | Lemcoff et al. | 55/26 |
| 5,441,558 | 8/1995 | Lee et al. | 95/100 |
| 5,520,720 | 5/1996 | Lemcoff | 95/101 X |
| 5,540,758 | 7/1996 | Agrawal et al. | 95/101 |

FOREIGN PATENT DOCUMENTS

| | | | |
|---|---|---|---|
| 2624759 | 12/1987 | France . | |
| 3338494 | 5/1985 | Germany | 95/96 |
| 52-065773 | 5/1977 | Japan | 95/96 |
| 60-132620 | 7/1985 | Japan | 95/96 |
| 63-79714 | 4/1988 | Japan . | |
| 2-172516 | 7/1990 | Japan | 95/98 |

*Primary Examiner*—Robert Spitzer
*Attorney, Agent, or Firm*—Geoffrey L. Chase

[57] ABSTRACT

A process for pressure swing adsorption of oxygen from a gas mixture containing at least oxygen and nitrogen to recover an unadsorbed nitrogen enriched product from a plurality of parallel piped adsorbent beds undergoing adsorption, depressurization and repressurization wherein the improvement is conducting a pressure transfer from one bed to another from an intermediate point of the bed finishing adsorption to a point closer to the feed end of a bed that is repressurizing to improve productivity and recovery of nitrogen enriched gas in the process.

10 Claims, 4 Drawing Sheets

NITROGEN PSA WITH INTERMEDIATE PRESSURE TRANSFER

BACKGROUND OF THE INVENTION

Pressure Swing Adsorption (PSA) is currently the technology of choice for the production of nitrogen within a specific range of product purities, pressures and flowrates. This range is limited by competing technologies, which include cryogenically produced liquid nitrogen (LIN), "LIN-assist" plants and alternative low-oxygen atmospheres such as those produced by an "exo" generator. Therefore, it is of commercial interest to improve the energy and capital efficiency of nitrogen PSA designs, both to open up new markets for this technology and to provide a competitive edge over other suppliers within the existing market range.

Energy and capital efficiency for nitrogen PSA are most easily represented by two performance measures, termed the process recovery and productivity, respectively. Recovery is the amount of nitrogen produced divided by the amount of compressed air feed required to produce it. Productivity is the amount of nitrogen produced divided by the volume of adsorbent required to produce it. These two factors are influenced by the process conditions, materials, cycle variables (such as step times) and the flow rates in any step of the process.

The nitrogen PSA process cycle has been given substantial attention worldwide and is highly optimized. A key recovery producing step is the so-called pressure equalization step. This step occurs when one bed is fully regenerated and the other bed has completed its nitrogen-producing stage. At this point, the regenerated bed is at low pressure (less than 20 psig) and the other bed is at or near its maximum adsorption pressure (typically 90-140 psig). It is desirable to save some of this pressure energy by transferring gas from the high pressure bed to the low pressure bed, prior to venting the high pressure bed and introducing feed to the low pressure bed.

Commercial practice has generally been to simply equalize the pressures between the beds, using a product to product end and feed to feed end arrangement. This type of pressure equalization step can be described as "equal", that is, the product to product end and feed to feed end flows are equal in magnitude, and "complete", at the end of the step, both vessels are at equal pressure. Furthermore, this equalization scheme is constrained to transfer the gas at the two ends of the high pressure vessel and to introduce this gas to the two ends of the low pressure vessel.

Because the primary challenge facing nitrogen PSA technology is to produce higher purities efficiently, it is important to note that requiring the pressure equalization step to be equal, complete and restricted to the gas at the ends of the vessels provides a barrier to optimizing the design of a PSA process for higher purities. In fact, significantly higher productivities and recoveries can be achieved if these constraints are removed.

Mid-bed equalization is well-known and occasionally practiced aspect of nitrogen PSA. Often, this has been practiced when adsorber beds are too long for standard pressure equalization to function properly without the addition of a mid-bed line. In these applications, gas transfer is entirely limited to corresponding points on the two beds, that is, no gas is transferred to a higher or lower point on the other bed.

On the other hand, U.S. Pat. No. 5,176,722 teaches a pressure equalization step in which gas is transferred from the product end of the high pressure bed to the feed end of the low pressure bed. In an alternative embodiment, equalization from the product end of the high pressure bed to both ends of the low pressure bed is also presented.

Kuraray Kokai 63-79714 (April 1988) teaches a three-bed, vacuum regenerated PSA system for high-purity nitrogen production. This approach, although obviously capital and energy intensive, is intriguing in its creative approach to focusing the benefits of vacuum regeneration where they are most useful and in the way in which long regeneration times can be employed without sacrificing nearly continual product generation. However, the high costs of this system render it uneconomical, unless other conventional sources of high-purity nitrogen are unavailable.

Finally, split bed designs, in which the adsorber bed consists of two separated beds in series, have been proposed. French Patent 2 624 759 to Hay has disclosed a three-bed process for the production of oxygen via air separation. Although these are split beds, the plumbing and process which he discloses does not allow for the transfer of gas from the point between these beds to the feed end of either of the other two beds, nor does the process allow for transfer from the secondary (top) adsorber to the point between the beds. Instead, repressurization of both the primary and secondary adsorbers comes from the product end of one of the other two primary adsorbers. This occurs while said primary adsorber is on feed; therefore this is not actually a classic pressure transfer (or "equalization") step.

U.S. Pat. No. 4,715,867 to Vo likewise teaches a split-bed design. However, the patent clearly teaches that the beds could be combined into a single bed with minor process and hardware changes. The patent is also important in that it focuses on air separation with carbon molecular sieve as the adsorbent. Vo discloses a process which follows a standard PSA cycle with the following key differences: (1) each vessel is replaced with a primary and auxiliary adsorbent bed in series; (2) pressure equalization is feed-to-feed and product-to-intermediate, where the intermediate point is the point between the primary and auxiliary beds; (3) the auxiliary bed on the regenerated half of the process is repressurized solely with product; this occurs simultaneously with the equalization step; (4) as an option, purge can be performed both with product and also with intermediate gas transfer; and (5) as an option, vacuum can be applied to assist in the regeneration of the beds.

U.S. Pat. No. 5,441,558 by the same inventors as herein discloses a nitrogen PSA process in two parallel beds wherein pressure equalization is performed feed end to feed end and product end to product end under controlled and less than full equalization conditions.

The shortcomings of the prior art in achieving enhanced productivity and recovery of a less strongly adsorbed gas from a gas mixture in an adsorptive gas separation is overcome by the present invention which achieves high productivity and recovery of a less strongly adsorbed product gas by controlled equalization or pressure transfer of gas in a higher pressure adsorbent bed to a lower pressure adsorbent bed by transfer from an intermediate location from the feed end and the product end of the high pressure adsorbent bed to the low pressure adsorbent bed, as will be set forth in greater detail below.

BRIEF SUMMARY OF THE INVENTION

The present invention is a process for separating a nitrogen-enriched gas from a feed gas mixture containing at least nitrogen and oxygen using a plurality of beds of adsorbent that preferentially adsorb oxygen more readily than nitrogen in a series of steps in each bed, comprising: adsorption at an elevated pressure to adsorb oxygen and recover a nitrogen-enriched gas as an unadsorbed product; depressurization to a lower pressure to remove adsorbed oxygen from the adsorbent; and repressurization to approximately adsorption pressure, the improvement comprising, after the step of adsorption in a first bed of the plurality of beds, transferring gas from an intermediate point of the first bed to a point closer to a feed end of a second bed of the plurality of beds to partially depressurize the first bed and to partially pressurize the second bed.

Preferably, the point closer to a feed end of a second bed is the feed end of the second bed.

Preferably, the transferring of gas is performed for less than necessary to pressure equalize the first bed and the second bed.

Preferably, during the transferring of gas from an intermediate point of the first bed, gas is also transferred from the product end of the first bed to the product end of the second bed.

Preferably, more than one transferring of gas from an intermediate point of the first bed to a point closer to a feed end of a second bed of the plurality of beds is performed.

Preferably, the plurality of beds is two parallel piped adsorbent beds which are operated through the steps out of phase with one another such that when one bed is performing adsorption the other bed is performing depressurization or repressurization.

Preferably, the plurality of beds are loaded with a carbon adsorbent kinetically more selective to the adsorption of oxygen than nitrogen.

In one alternative, the intermediate point is approximately half the distance from the product end of the first bed and the feed end of the first bed.

Preferably, after the depressurization, each bed is subjected to a purge with product quality gas.

Preferably, the depressurization, the purge and the repressurization are performed countercurrent to the flow of feed gas mixture of the adsorption.

DETAILED DESCRIPTION OF THE INVENTION

Figure 1A:
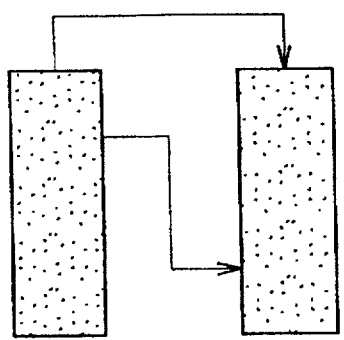
FIGS. 1a–e are a series of schematic illustrations of various embodiments of the intermediate sourced pressure equalizations or gas transfers in a 2-bed nitrogen PSA of the present invention.

The present invention improves upon product-product end and feed-feed end pressure transfer in a nitrogen PSA having multiple parallel piped adsorbent beds by using one or more gas pressure transfer flows which have their origin at some intermediate point from the feed end and the product end of the high pressure bed and which terminate at a point closer to the feed end of the low pressure bed, than the intermediate source point of the high pressure bed. This point can be the feed end of the low pressure bed. Product-product end pressure transfer is still maintained as a part of the present invention or transfer to a point in the receiving bed which is proximate to its product end. A number of the embodiments of the present invention are illustrated in FIG. 1 as illustrations (a) through (e).

The present invention requires a modified piping arrangement over that of the prior art, which prior art does not use intermediately sourced pressure transfer. FIG. 2 shows an example of one such piping arrangement, which would be amenable for the pressure transfer scheme shown in FIG. 1(e).

Important aspects of the nitrogen PSA configuration for obtaining the benefit of the present invention are:

(a) Gas transfer from a point intermediate the product end and the feed end of the high pressure bed to a point upstream or closer to the feed end of the low pressure bed than such intermediate point of said high pressure bed during the pressure transfer step;

(b) Controlling the quantity of gas transferred in each of the pressure transfer lines;

(c) Controlling the duration of the gas transfer step.

Options for the present invention which afford additional benefits to those recited above include:

(a) Minimizing or eliminating feed to feed end gas transfer;

(b) Addition of a third pressure transfer line, again from an intermediate point of the high pressure bed to an upstream point or point closer to the feed end of the low pressure bed than that intermediate point of the high pressure bed;

(c) Independent control of the durations of transfer through each line, that is, allowing transfer through one or more lines to occur over a different period than the others.

The modified pressure transfer configuration of the present invention with intermediate pressure transfer for nitrogen PSA processes illustrated in FIG. 2 improves upon the current state of the art cycle which would be similar to the illustration in FIG. 2 (but without the lines and valves associated with valves 8–12 and orifices D1 and D2), which state of the art cycle is comprised of the following steps:

Step 1: Bed A is pressurized from both the feed and product end. Compressed air enters through valves 1 and 2 (feed end), while product from the receiver tank RT flows through valves 20 and 18 (product end). Simultaneously, Bed B is depressurized through valves 5 and 7.

Step 2: As the pressure in Bed A exceeds that in RT, backflow ceases and product generation resumes. Valves 1, 2, 18 and 20 remain open. Meanwhile, valve 6 opens, allowing rapid depressurization of Bed B with an oxygen enriched vent stream 22. A small portion of the product from Bed A flows through valve 14 to purge Bed B during regeneration.

Step 3: With Bed A continuing to produce product, valves 5, 6 and 7 close, terminating venting of Bed B. At this point, pressure begins to build in Bed B due to the desorption of gas from the adsorbent, as well as the continued flow of purge gas into the bed.

Step 4: Idle

Step 5: Pressure Transfer. Some pressure is transferred from Bed A to Bed B in a product-product end through valves 16 and 17 and feed-feed end through valves 4 and 5. The amount of gas transferred through each of these lines is regulated by hand-controlled valves or orifices.

Step 6: Idle

Steps 7–12: Steps 1–6 are repeated with Bed B on feed and Bed A being regenerated. Feed would flow through valves 1 and 3 to Bed B with product flowing through valves 19 and 20 into receiver tank RT and ultimately to an end use as product in line 21. In a two bed process, Bed A and Bed B are 180 degrees out of phase in the timing of the process steps, so that when Bed A is on adsorption, Bed B is on depressurization and/or regeneration. When one bed is depressurizing during intermediate gas pressure transfer, the other bed is pressurizing during intermediate gas pressure transfer. An appropriate intermediate point on the high pressure bed undergoing depressurization by gas pressure transfer to a low pressure bed is approximately half way between the feed end and the product end of the high pressure bed. The depressurization, purge and product repressurization are conducted countercurrent to the flow of feed gas mixture in the bed during adsorption and production of nitrogen enriched product gas.

In the present invention, Steps 5 and 11 would be replaced by a modified gas pressure transfer configuration of the type shown in FIGS. 1(a) through (e). For instance, using the intermediate gas pressure transfer of FIG. 1(e) in the system depicted in FIG. 2, Step 5 would proceed by gas in Bed A entering orifice D1 located at an intermediate point between the feed end and the product end of Bed A and passing through open valves 8 and 10 before passing through check valve 12 to enter Bed B at its feed end or optionally at any point closer to the feed end of Bed B than the intermediate gas source point of D1 of Bed A. This gas pressure transfer is for less than a full and complete equalization and is for a time less than full equalization would require and may be independent in time of the product-product end gas pressure transfer through valves 16 and 17. Step 11 would be the equivalent intermediate gas transfer from Bed B to Bed A going through orifice D2, valves 9 and 10 and check valve 11. The intermediately sourced gas pressure transfer at least partially depressurizes the high pressure bed and at least partially pressurizes the low pressure bed in relation to the adsorption pressure.

EXAMPLES

All of these data were acquired using the same type of kinetically oxygen selective carbon molecular sieve adsorbent and bed size, and a maximum adsorption pressure of 100 psig.

Example 1

(Comparative)

PSA performance was obtained using incomplete and unequal pressure transfer, but still confined to product-product end and feed-feed end piping. This is referred to as "Standard" performance without the intermediate gas pressure transfer of the present invention. This is the performance expected with the process of U.S. Pat. No. 5,441,558. In these experiments the amount of product-product end transfer was in the range of 16–20 pounds per square inch differential (psid) and the amount of feed-feed end transfer was 15–17 psid. Psid for a discrete pressure transfer is based upon the total pressure transfer between beds modified by the percentage opening of the valves in the particular pressure transfer line. For instance, if the total pressure transferred between two beds is 50 psid and the intermediate pressure transfer valve is opened 50%, then the pressure transfer attributed to the intermediate pressure transfer line is 25 psid.

Example 2

Performance achieved using FIG. 1(a) in a 150 second half-cycle was obtained. Pressure transfer was carried out in two steps: product-product end alone for 1.0–1.5 seconds (4–6 psid), followed by product-product end and intermediate pressure transfer for 4.0–4.4 seconds. Total product-product end transfer was 17–19 psid; total intermediate transfer was 18–19 psid.

Example 3

Figure 1B:
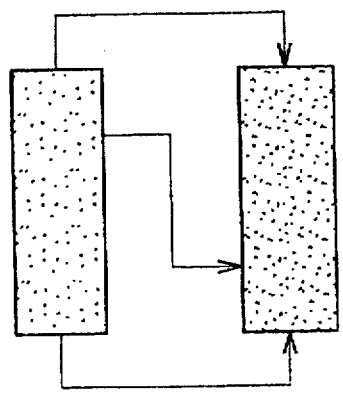

Performance achieved using FIG. 1(b) in a 150 second half-cycle was obtained. Pressure transfer was carried out in two steps: product-product end alone for 1.5 seconds (6 psid), followed by all three transfer flows for 3.5 seconds (product-product end, intermediate, feed-feed end). Flow distribution was 18 psid product-product end, 14 psid intermediate and 7 psid feed-feed end.

Example 4

Figure 1C:
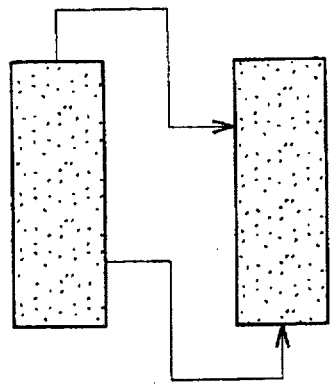

Performance achieved using FIG. 1(c) in a 180 second half-cycle was obtained. Pressure transfer was performed in one step, with 17–19 psid transferred from the product end to an upper intermediate point and 17–21 psid transferred from the lower intermediate point to the feed end.

Example 5

Figure 1D:
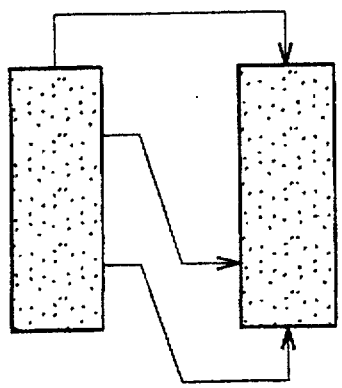

Performance achieved using FIG. 1(d) in both 150 and 180 second half-cycle processes was obtained. Details of the five data points are as follows:

| Pt.* | Time Prod/all | Prod (psid) | Int. (psid) | Feed (psid) | Cycle (secs.) |
| --- | --- | --- | --- | --- | --- |
| 1 | 0.8/4.4 | 11 | 10 | 18 | 150 |
| 2 | 1.5/3.5 | 17 | 13 | 10 | 150 |
| 3 | 1.3/3.7 | 17 | 13 | 10 | 150 |
| 4 | 1.5/3.5 | 17 | 13 | 9 | 180 |
| 5 | 1.5/3.5 | 17 | 13 | 10 | 180 |

*Reference number for drawings.

Example 6

Figure 1E:
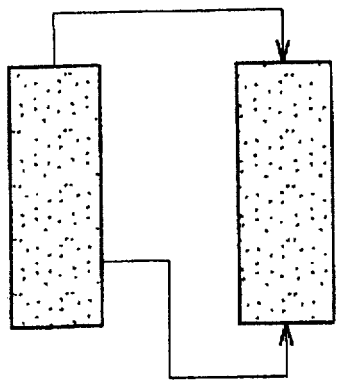
Figure 2:
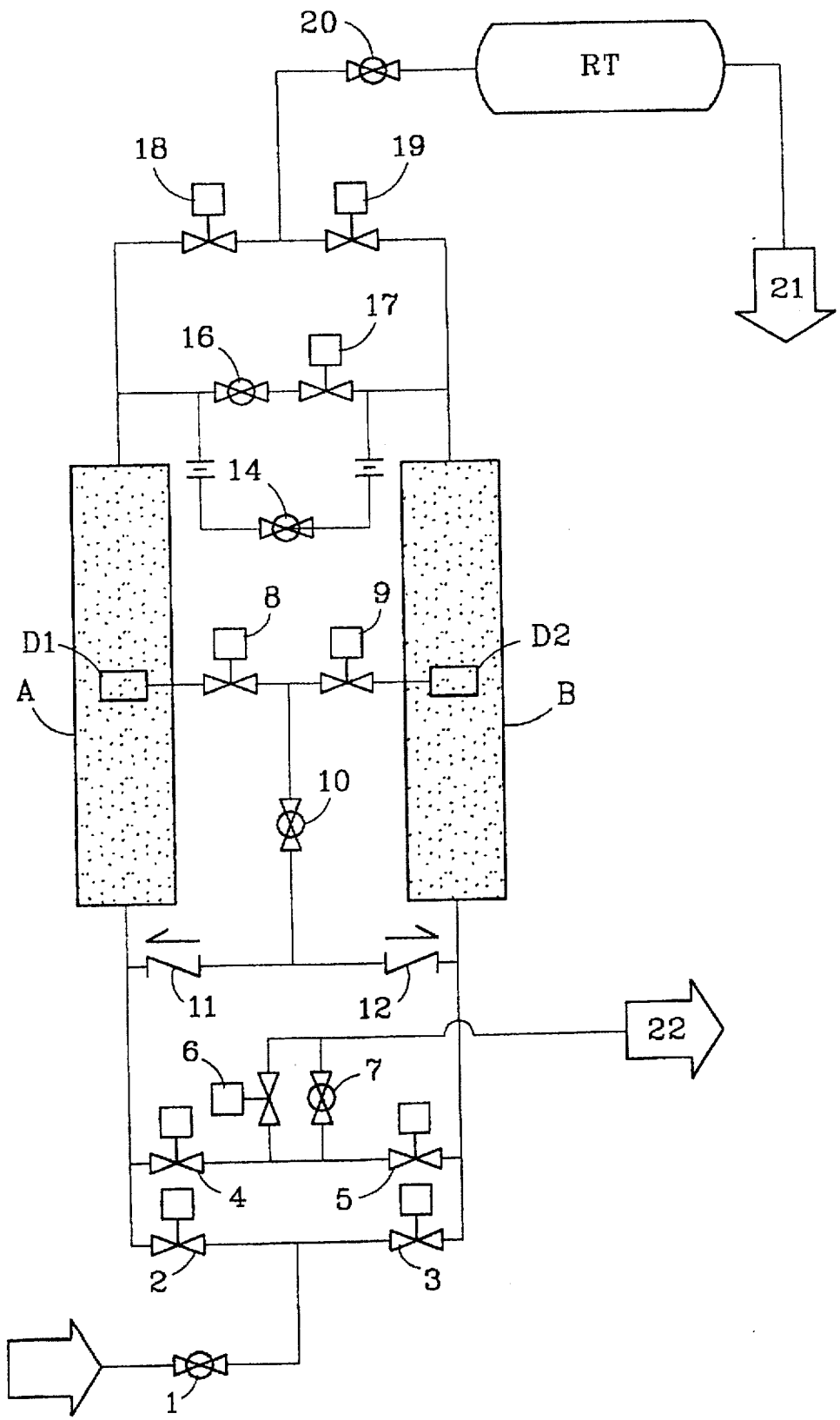
FIG. 2 is a schematic illustration of an embodiment of the present invention in greater detail depicting flow lines and control valves for the embodiment of FIG. 1e.

Performance achieved using FIG. 1(e) in both 150 and 180 second half-cycle processes was obtained. Details of the eight data points are as follows:

| Pt. | Time Prod/all | Prod (psid) | Feed (psid) | Cycle (secs.) |
| --- | --- | --- | --- | --- |
| 6 | 1.0/5.0 | 19 | 16 | 150 |
| 7 | 0.0/6.0 | 19 | 18 | 150 |
| 8 | 0.0/6.0 | 19 | 17 | 150 |
| 9 | 0.0/5.6 | 18 | 17 | 150 |

-continued

| Pt. | Time Prod/all | Prod (psid) | Feed (psid) | Cycle (secs.) |
|---|---|---|---|---|
| 10 | 0.0/6.4 | 21 | 17 | 150 |
| 11 | 0.0/6.0 | 19 | 19 | 150** |
| 12 | 0.0/6.0 | 9 | 17 | 180 |
| 13 | 0.0/6.2 | 20 | 16 | 180 |

*Reference number for drawings. **Transfer: 1/3 from top to bottom

FIGS. 3–6 show the increase in Productivity and Recovery observed using FIGS. 1(a) through (e) compared with the Standard performance. All values for the processes of the present invention represented by FIGS. 1(a)–(e) and the comparable Standard process are on a similar purity (ppm oxygen) value. Several runs of the various embodiments of FIG. 1 were performed with slight variations in timing or gas transfer which accounted for the several results attributed to the particular embodiment.

Figure 3:
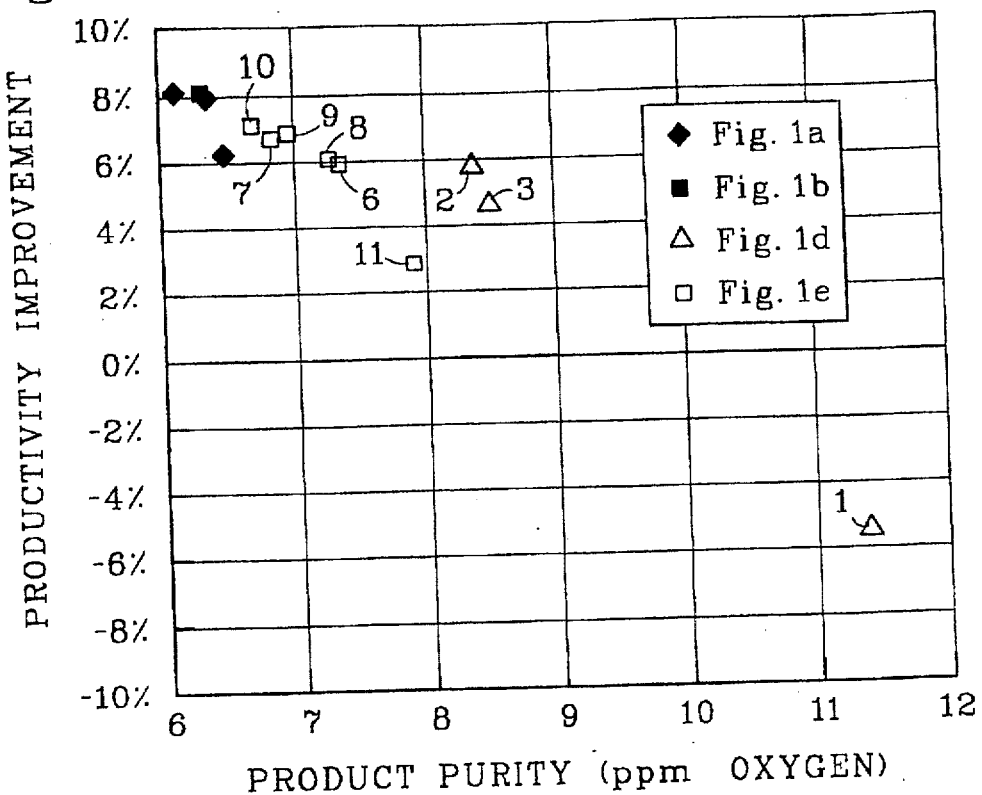
FIG. 3 is a graph of Productivity improvements of the embodiments of FIGS. 1a–e versus a standard nitrogen PSA process on a 150 second half cycle without the benefits of intermediate sourced pressure equalization or gas transfers.

FIG. 3 shows embodiments of FIGS. 1(a), (b), (d) and (e) compared to the Standard process described above for Productivity at given purities. The embodiments of the present invention show a 2 to 8% improvement in Productivity over the Standard process, except for one run of FIG. 1(d) where too much gas was transferred across the Intermediate gas transfer line closest to the feed end, resulting in reduced performance. The cycle was a 150 second half cycle.

Figure 4:
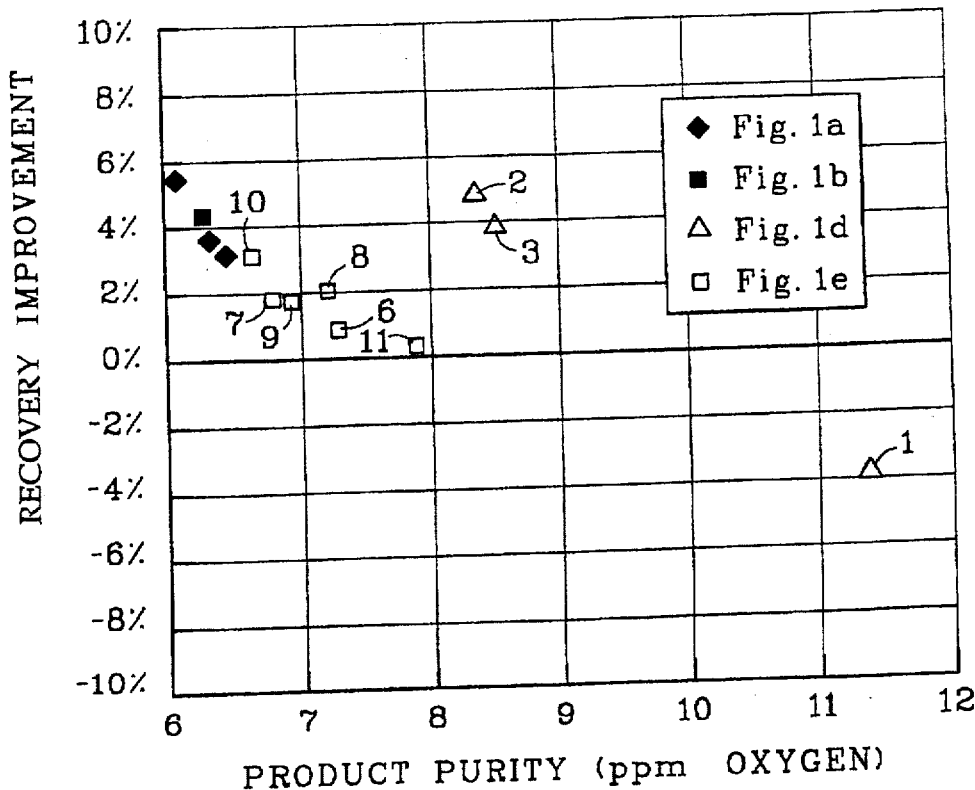
FIG. 4 is a graph of Recovery improvements of the embodiments of FIGS. 1a–e versus a standard nitrogen PSA process on a 150 second half cycle without the benefits of intermediate sourced pressure equalization or gas transfers.

FIG. 4 shows the same runs as FIG. 3, but reporting Recovery rather than Productivity. Recoveries improved generally in the 1 to 5% range, with the same exception for one run of FIG. 1(d).

Figure 5:
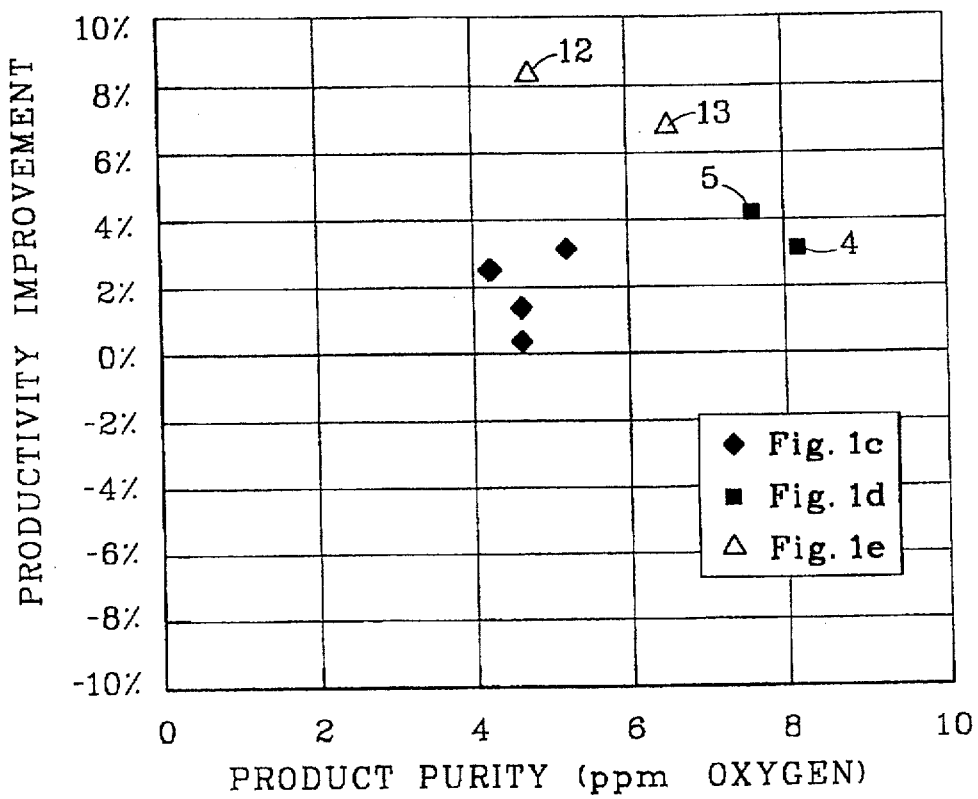
FIG. 5 is a graph of Productivity improvements of the embodiments of FIGS. 1a–e versus a standard nitrogen PSA process on a 180 second half cycle without the benefits of intermediate sourced pressure equalization or gas transfers.

FIG. 5 shows embodiments of FIG. 1(c), (d) and (e) compared to the Standard process described above for Productivity at given purifies. The embodiments of the present invention show generally a 1 to 8% improvement in Productivity over the Standard process. The cycle was a 180 second half cycle.

Figure 6:
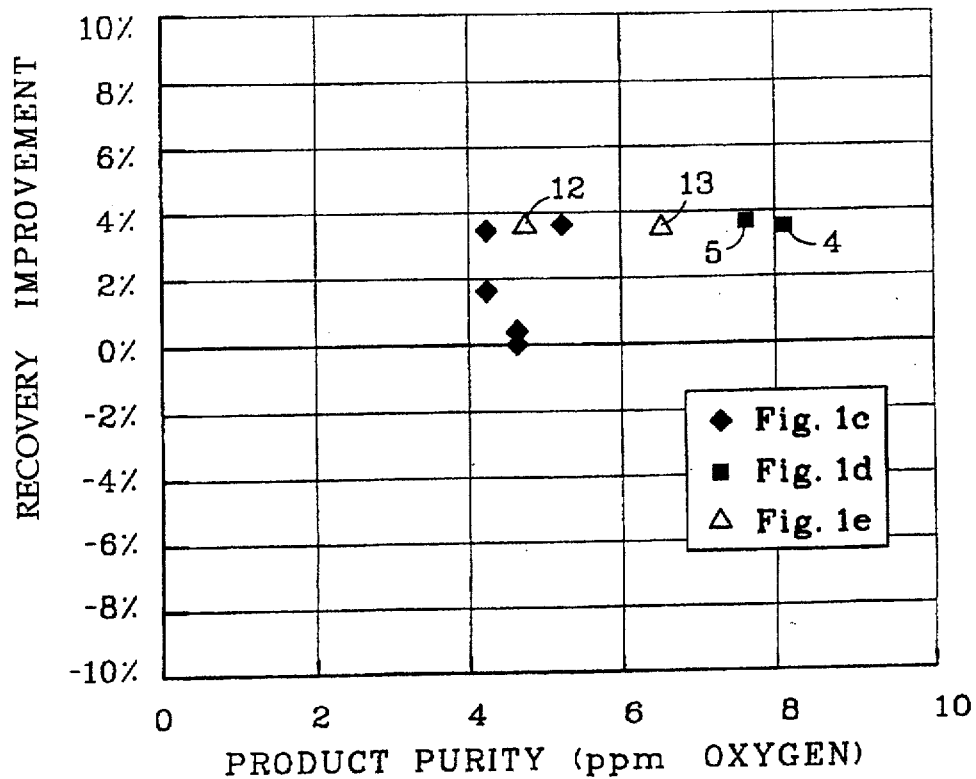
FIG. 6 is a graph of Recovery improvements of the embodiments of FIGS. 1a–e versus a standard nitrogen PSA process on a 180 second half cycle without the benefits of intermediate sourced pressure equalization or gas transfers.

FIG. 6 shows the same runs as FIG. 5, but reporting Recovery rather than Productivity. Recoveries improved generally in the 1 to 4% range.

The following conclusions can be drawn from these graphs (a) adjustment of the amounts, duration and connection location of the pressure transfer flows in the context of the present invention can yield up to an 8% reduction in required bed volume and up to a 5% reduction in the feed air requirement over the standard "state-of-the-art" high-purity Nitrogen PSA technology.

(b) proper control and adjustment of the various pressure transfer flows is beneficial to obtaining good performance. Compare, for example, data points 1–3 of FIG. 4. All were obtained using FIG. 1(d) and a 150 second half-cycle with a roughly 5 second pressure transfer step. In Run 1, too much gas was transferred across the pressure transfer line closest to the teed end, markedly undermining the performance. Adjustment can be made based upon simple evaluation of the respective flows as is well known by those that design and operate nitrogen PSA systems.

(c) gas transferred from the product end of the high-pressure bed is best transferred to the product end of the low pressure bed. This keeps the product end of the bed "clean". Compare FIG. 1(c) to FIGS. 1(d) and 1(e) in the 180 second data for an illustration of this. Therefore, the preferred embodiment of this invention would retain product-product end transfer (FIGS. 1(a), (b), (d) and (e)).

(d) the FIG. 1(b) run shows that simply by adding an intermediate transfer line (from nearer the product end to closer to the feed end on the respective vessels) to the standard product-product end and feed-feed end configuration, an 8% productivity and 4% recovery improvement is obtained.

The time and rate provided for gas pressure transfer should be sufficient to transfer the desired amount of gas pressure without physically disturbing the packing of the adsorbent in the bed and still allow the kinetic selectivity of the adsorbent to preferentially adsorb oxygen over nitrogen.

Product-product end pressure transfer is beneficially initiated first and is beneficially always performed with the intermediate pressure transfer. Full pressure transfer or full pressure equalization is preferably not achieved. The intermediate pressure transfer preferably does not exceed 1.5 times the pressure transfer of the product-product end pressure transfer.

The basic advantage of the present invention is that a considerable quantity of high-purity gas, located in the middle and product end-middle portions of the high-pressure bed, is not wasted by the process cycle, but instead is transferred to the low pressure bed. Additionally, this gas is transferred to a beneficial location on the low pressure bed. As a general principle, gas transfer should go from an intermediate point on the high-pressure bed to a corresponding point on the low-pressure bed which is most gas composition compatible with it. Since the low-pressure bed is newly regenerated countercurrently, this compatible point will be found at a point closer to the feed end on the low-pressure bed. A key exception, already noted, is that it is imperative to maintain purity at the product end of the low-pressure bed. For this reason, product-product end transfer is important.

The value of the present invention lies in the fact that it makes high-purity nitrogen PSA amenable to an increased range of markets and increases the competitiveness of this technology against other sources of nitrogen. The 4–8% performance improvements will frequently be sufficient to allow the selection of a smaller compressor or a smaller PSA design and result in a more cost competitive product.

The present invention has been set forth with regard to several preferred embodiments, however the scope of the present invention should be ascertained from the claims that follow.

We claim:

1. A process for separating a nitrogen-enriched gas from a feed gas mixture containing at least nitrogen and oxygen using a plurality of beds of adsorbent that preferentially adsorb oxygen more readily than nitrogen in a series of steps in each bed, comprising: adsorption at an elevated pressure to adsorb oxygen and recover a nitrogen-enriched gas as an unadsorbed product; depressurization to a lower pressure to remove adsorbed oxygen from the adsorbent; and repressurization to approximately adsorption pressure, the improvement comprising, after the step of adsorption in a first bed of said plurality of beds, transferring gas from an intermediate point of said first bed to a point closer to a feed end of a second bed of the plurality of beds to partially depressurize said first bed and to partially pressurize said second bed.

2. The process of claim 1 wherein said point closer to a feed end of a second bed is a feed end of said second bed.

3. The process of claim 1 wherein said transferring gas is performed for less than necessary to pressure equalize said first bed and said second bed.

4. The process of claim 1 wherein during said transferring gas from an intermediate point of said first bed, gas is also transferred from the product end of said first bed to the product end of said second bed.

5. The process of claim 1 wherein more than one transferring of gas from an intermediate point of said first bed to a point closer to said feed end of said second bed of said plurality of beds is performed.

6. The process of claim 1 wherein said plurality of beds is two parallel piped adsorbent beds which are operated through said steps out of phase with one another such that when one bed is performing adsorption the other bed is performing depressurization or repressurization.

7. The process of claim 1 wherein said plurality of beds are loaded with a carbon adsorbent kinetically more selective to the adsorption of oxygen than nitrogen.

8. The process of claim 1 wherein said intermediate point is approximately half the distance from the product end of said first bed and the feed end of said first bed.

9. The process of claim 1 wherein after said depressurization, each bed is subjected to a purge with product quality gas.

10. The process of claim 9 wherein said depressurization, said purge and said repressurization are performed countercurrent to the flow of feed gas mixture of said adsorption.

* * * * *